United States Patent Office 3,537,837
Patented Nov. 3, 1970

3,537,837
METHOD OF KILLING UNDESIRED PLANTS
Shu Mitsuya and Shin Fujisawa, Tokyo, Akira Hirose, Yokohama, and Yoshio Takazawa, Chigasaki, Japan, assignors to Mitsui Toatsu Chemicals Incorporated, Tokyo, Japan, a corporation of Japan
No Drawing. Filed Apr. 6, 1967, Ser. No. 628,819
Int. Cl. A01n 5/00, 13/00
U.S. Cl. 71—65   6 Claims

ABSTRACT OF THE DISCLOSURE

Method for inhibiting the growth of undesirable plants comprising applying a sulfamic acid-ammonium sulfate double salt represented by the formula $$NH_2SO_3H—(NH_4)_2SO_4$$

to the above-ground portions of said plants and compositions therefor.

---

This invention relates to compositions and methods for inhibiting the growth of plants.

It is already known that sulfamic acid and its salts have herbicidal properties. However, there are defects in that these materials are so hygroscopic that it is difficult to use them as granules and dusts which are the most desirable forms in agriculture and forestry and in that their herbicidal effects are rather low.

An object of the present invention is to provide an improved herbicidal method.

Another object of the present invention is to provide a herbicidal composition high in the herbicidal effect.

A further object of the present invention is to provide a herbicidal composition which is low in the hygroscopicity and is easy to handle in solid form.

According to the present invention, a new composition and method for inhibiting the growth of plants are provided by employing a sulfamic acid-ammonium sulfate double salt represented by $NH_2SO_3H—(NH_4)_2SO_4$ as an active herbicide.

The above-mentioned sulfamic acid-ammonium sulfate double salt is a water-soluble white crystal obtained by hydrolyzing ammonium imidosulfonate, $HN(SO_3NH_4)_2$, with a dilute acid such as sulfuric acid.

The method of the present invention is carried out by applying a growth inhibiting amount of the above-mentioned sulfamic acid-ammonium sulfate double salt to the stems and leaves (the above-ground portions) of undesirable plants. The rate of application of the sulfamic acid-ammonium sulfate double salt preferably is 200 to 5,000 grams per are.

This sulfamic acid-ammonium sulfate double salt shows a nonselective herbicidal action and is effectively used to prevent broad-leaved weeds, grasses and brushes. This double salt can be applied as an aqueous solution or as a dust. The concentration in the aqueous solution preferably is 2 to 50% by weight. The dust does not require water in its application, is convenient to carry and dispense and is therefore the most preferable form in using the double salt as a herbicide. The dust is prepared by mixing a solid inert carrier, such as, talc, bentonite, calcium carbonate, clay, diatomaceous earth or sawdust, with a sulfamic acid-ammonium sulfate double salt having a fineness preferably of 40 to 100 meshes per inch and grinding the resulting mixture so that all of the mixture may pass through a sieve preferably of 30 meshes per inch or specifically preferably of 50 meshes per inch. The amount of the solid inert carrier preferably is 0.05 to 4 parts of the inert carrier per part of the sulfamic acid-ammonium sulfate double salt. In addition, a surface active agent, such as, an alkali metal salt of an alkyl- benzenesulfonic acid, a water-soluble salt of ligninsulfonic acid, a polyoxyethylene alkylphenol ether, polyoxyethylene sorbitan monolaureate or an alkali-casein composition in an amount of not more than 5% based on the weight of the dust may be added to the dust as spreader and sticker.

Furthermore, the herbicidal activity of the double salt can be promoted by adding another herbicide, such as, 2,4,5-trichlorophenoxyacetic acid or its salt, 2,4-dichlorophenoxyacetic acid or its salt, 2-mehyl-4-chlorophenoxyacetic acid or its salt, 2-(2-methyl-4-chlorophenoxy)propionic acid, 2-methoxy-3,6-dichlorobenzoic acid, 4-amino-3,5,6,-trichloropicolic acid, maleic hydrazide, $\alpha,\alpha$-dichloropropionic acid or its salt, or mixtures thereof, in an amount or not more than 5% based on the weight of the sulfamic acid-ammonium sulfate double salt.

The method of the present invention shall be described more particularly. When using the sulfamic acid-ammonium sulfate double salt as a dust, the following amounts of its should be uniformly dusted on the stems and leaves (the above-ground portions) of undesirable plants:

(a) 300 to 1,000 grams/are on annual broad-leaved weeds,
(b) 500 to 3,000 grams/are on annual grasses,
(c) 1,000 to 5,000 grams/are on perennial grasses and
(d) 1,000 to 5,000 grams/are on brushes (not more than 2 meters high).

When using the sulfamic acid-ammonium sulfate double salt as an aqueous solution, the following amounts of the double salt dissolved in 7 to 10 liters of water should be sprayed on the stems and leaves of undesirable plants:

(a) 200 to 1,000 grams/are on annual weeds,
(b) 300 to 3,000 grams/are on annual grasses,
(c) 700 to 5,000 grams/are on perennial grasses and
(d) 700 to 5,000 grams/are on brushes (not more than 2 meters high).

Also included in this invention is the method wherein a deep cut is made around the trunk of an undesirable hard-wood plant or tree having a diameter of not less than 10 cm. and is treated with a dust, crystal or concentrated solution of this double salt so that tree may die standing. This invention also includes the method wherein a standing tree is cut down and a dust, crystal or concentrated solution of this double salt is sprinkled on the stump so that the sprouting and revival of the stump is prevented.

The herbicidal composition and method of the present invention are adapted to be used to inhibit weeds on such nonagrarian grounds as factory sites, road sides and railway lines and weeds and brushes under power-transmission lines and on forest grounds.

The herbicidal activity of the herbicidal composition used in the present invention is stronger than of conventional sulfamic acid or its salt. When the composition is in the form of a dust, its hygroscopicity is very low and its dust delivering property is favorable.

The herbicidal effect of the herbicide of the present invention shall now be shown with reference to the following examples in which the parts and percentages are by weight.

EXAMPLE I

Fifty parts of a sulfamic acid-ammonium sulfate double salt passing through a 60 mesh sieve (the peak of the distribution of grain size was 100 meshes per inch), 49.5 parts of finely divided talc and 0.5 part of sodium dodecylbenzenesulfonate were mixed together and were ground to obtain a fine dust.

The following contact toxicity tests and under-weed inhibiting tests in a forest ground were made by using this dust.

(I) Contact phyto-toxicity tests (1) *Testing method.*—Each of several Wagner's pots of 1/5000 are was charged with 3 kg. of air dried soil. A compound fertilizer containing 0.8 g. of each of N, $P_2O_5$ and $K_2O$ was mixed with the soil. The water content in the soil was brought to 60% of the maximum water capacity of the soil. Ten seeds of barnyard grasses were sown in each pot, were covered with the soil 1 cm. deep and were grown in a greenhouse at 25° C. A prescribed amount of the above-described dust was dusted with a slight amount dusting apparatus in the third-leaf stage.

(II) Under-weed inhibiting tests in a forest ground (1) *Testing method.*—500, 1,000 and 1,500 g./are of the above-described sulfamic acid-ammonium sulfate double salt dust as a herbicidal constituent were dusted with a manual duster to inhibit under-weeds in a triennial cryptomeria forest. The test was made in duplicate on sections of 1 are each. The herbicidal effects were observed 3 months after the herbicidal composition was sprinkled. For comparison, the same test as mentioned above was made using each of the other dusts used for comparison in the contact phyto-toxicity tests.

(2) *Test results.*—The results obtained are shown in Table 2.

TABLE 2

| Herbicide | Amount of the dusted herbicide in gr./are | Herbicidal effect [1] | Harm of herbicide to cryptomeria [2] | General conditions |
|---|---|---|---|---|
| Sulfamic acid | 500<br>1,000<br>1,500 | 1<br>2<br>2 | −<br>+<br>++ | Generally the weed-killing effect was low, the harm to cryptomeria was great, and the dust delivering property was unfavorable. |
| Ammonium sulfamate | 5,00<br>1,000<br>1,500 | 1<br>2<br>3 | +<br>++<br>+++ | The herbicidal effect was high but the harm to cryptomeria was great and the dust delivering property was unfavorable. |
| Sulfamic acid-ammonium sulfate double salt. | 500<br>1,000<br>1,500 | 3<br>4<br>4 | −<br>+<br>++ | The herbicidal effect was very high, the harm to cryptomeria was slight and the dust delivering property was favorable. |
| Mixture of 1.19 parts of ammonium sulfate with 1 part of sulfamic acid. | 500<br>1,000<br>1,500 | 2<br>3<br>4 | −<br>+<br>++ | The herbicidal effect was high but the harm to cryptomeria was comparatively great and the dust delivering property was unfavorable. |

[1] The indications of the herbicidal effect are as follow: (4) very high and no cutting of under-weed was required; (3) high and partial cutting of under-weed was required; (2) medium degree and total cutting of under-weed was required; (1) low degree and total cutting of under-weed was required.

[2] The indications of the harm of herbicide to cryptomeria are as follow: (+++) severe harm, half died; (++) new treetops died; (+) lower leaves changed to be brown; (−) no harm.

For comparison, the same test was made by using a dust prepared by exactly the same method except that the herbicidal constituent in the above-mentioned dust was replaced with an equal weight of each of sulfamic acid, ammonium sulfamate and a mixture of 1 part of sulfamic acid and 1.19 parts of ammonium sulfate.

(2) *Test results.*—The results obtained are shown in Table 1.

TABLE 1

| Herbicide | Herbicide in gr./pot | Indication of contact phyto-toxicity |
|---|---|---|
| Sulfamic acid ($NH_2SO_3H$) | 1.00<br>0.75<br>0.50<br>0.25<br>0.10<br>0.05 | ×<br>++++<br>+++<br>++<br>+<br>− |
| Ammonium sulfamate ($NH_2SO_3NH_4$) | 1.00<br>0.75<br>0.50<br>0.25<br>0.10<br>0.05 | ×<br>×<br>++++<br>++<br>+<br>− |
| Sulfamic acid-ammonium sulfate double salt ($NH_2SO_3H-(NH_4)_2SO_4$) | 1.00<br>0.75<br>0.50<br>0.25<br>0.10<br>0.05 | ×<br>×<br>×<br>++++<br>+++<br>++ |
| Mixture of 1.19 parts of ammonium sulfate with 1 part of sulfamic acid ($NH_2SO_3H+(NH_4)_2SO_4$) | 1.00<br>0.75<br>0.50<br>0.25<br>0.10<br>0.05 | ×<br>×<br>++++<br>+++<br>++<br>+ |
| Not treated | | − |

NOTE.—The indications of the contact phyto-toxicity are as follows ×, died; ++++, severe harm and half died; +++, medium harm; ++, small harm; +, slight harm, −, no harm.

EXAMPLE II

Preparation of sulfamic acid-ammonium sulfate double salt.

360 parts of a solution consisting of 23.6% sulfamic acid, 32.2% ammonium sulfate and 44.2% water were introduced into a reactor provided with a stirrer. 2 parts of sulfuric acid of a concentration of 98% and 100 parts of pulverized ammonium imidosulfonate were added thereto. The mixture was kept at 55° C. for 2 hours while being stirred to complete the hydrolyzing reaction.

After the completion of the hydrolysis, 5 parts of crystals of sulfamic acid-ammonium sulfate double salt were added as seed crystals to the reaction mixture and the mxture was cooled to deposit crystals. The deposited crystals were separated from the mother liquor by centrifugal separation and were dried to obtain 114 parts of crystals including the double salt crystals added as seed crystals.

The results of the chemical analysis of the thus obtained crystals were as follows:

| | Percent |
|---|---|
| $HSO_3NH_2$ | 42.15 |
| $(NH_4)_2SO_4$ | 57.58 |
| $H_2O$ | 0.27 |

A comparison of the X-ray diagram of these crystals and the X-ray diagram of a mixture of 1 mol of sulfamic acid and 1 mol of ammonium sulfate shows that the crystals obtained by the above-described method are a true double salt and not an equimolar mixture of sulfamic acid and ammonium sulfate.

What is claimed is:

1. Method of killing undesirable plants comprising applying to the above-ground portions of said plants a herbicidal composition comprising an inert solid carrier mixed with a sulfamic acid-ammonium sulfate double salt in an effective amount.

2. Method of killing undesirable plants comprising applying an effective amount of a sulfamic acid-ammonium sulfate double salt to the above-ground portions of said plants.

3. Method of killing undesirable plants according to claim 2 wherein said double salt is dissolved in water and is applied at the rate of 200 to 5,000 grams of said double salt per are.

4. Method of killing undesirable plants according to claim 1 wherein the amount of inert solid carrier is about 0.05 to about 4 weight parts per weight part of said double salt and the composition is applied to said plants at the rate of 300 to 5,000 grams of said composition per are.

5. Method of killing undesirable plants according to claim 1 wherein said herbicidal composition contains up to about 5 percent of a surface active agent based on the total weight of said composition and said composition is applied to said plants at the rate of 300 to 5,000 grams of composition per are.

6. Method of killing undesirable plants according to claim 5 wherein the inert solid carrier is talc in an amount of about 0.05 to about 4 weight parts per weight part of said salt and the surface active agent is sodium dodecylbenzene sulfonate and said herbicidal composition is applied to said plants at the rate of 300 to 5,000 grams of said composition per are.

References Cited

UNITED STATES PATENTS 2,277,744  3/1942  Cufery et al. _____ 71—65

OTHER REFERENCES

Uchida et al., Chemical Abstracts, vol. 47, col. 2621 (1953).

JAMES O. THOMAS, JR., Primary Examiner

U.S. Cl. X.R.

71—82, 84